(12) United States Patent
Kopischke

(10) Patent No.: US 6,359,553 B1
(45) Date of Patent: Mar. 19, 2002

(54) METHOD AND CONTROL ARRANGEMENT FOR MINIMIZING CONSEQUENCES OF ACCIDENTS

(75) Inventor: Stephan Kopischke, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/340,536

(22) Filed: Jun. 28, 1999

(30) Foreign Application Priority Data

Jun. 26, 1998 (DE) .......................... 198 28 693

(51) Int. Cl.[7] .............................. B60Q 1/00
(52) U.S. Cl. .................. 340/436; 180/169; 701/301
(58) Field of Search .......................... 340/903, 435, 340/436; 701/301, 23; 180/169

(56) References Cited

U.S. PATENT DOCUMENTS

| | | | |
|---|---|---|---|
| 3,592,051 A | 7/1971 | Kubo | |
| 5,332,057 A | 7/1994 | Butsuen et al. | 180/169 |
| 5,461,357 A | 10/1995 | Yoshioka et al. | 340/435 |
| 5,473,538 A | 12/1995 | Fujita et al. | |
| 5,541,590 A | 7/1996 | Nishio | 342/72 |
| 5,734,344 A | 3/1998 | Yamada | 340/903 |
| 5,745,870 A | 4/1998 | Yamamoto et al. | 340/903 |
| 5,748,477 A * | 5/1998 | Katoh | 340/435 |
| 5,841,366 A | 11/1998 | Yamamoto et al. | 340/901 |
| 5,913,919 A | 6/1999 | Bauer et al. | 180/169 |
| 5,959,552 A * | 9/1999 | Cho | 340/435 |
| 5,983,161 A * | 11/1999 | Lemelson et al. | 340/436 |
| 6,037,860 A * | 3/2000 | Zander et al. | 340/903 |
| 6,084,508 A * | 7/2000 | Mai et al. | 340/435 |

FOREIGN PATENT DOCUMENTS

| | | |
|---|---|---|
| DE | 03637165 | 5/1988 |
| DE | 03830790 | 3/1990 |
| DE | 04140327 | 6/1993 |
| DE | 04310354 | 10/1993 |
| DE | 04335979 | 4/1995 |
| DE | 19512681 | 10/1996 |
| DE | 19620886 | 11/1997 |
| DE | 19647283 | 11/1997 |
| DE | 19534942 | 5/1998 |
| EP | 0439979 | 12/1990 |
| WO | WO9506305 | 3/1995 |

OTHER PUBLICATIONS

JP 08 072639 A (Sugita Katsuyuki), Mar. 19, 1996 See Abstract.

* cited by examiner

Primary Examiner—Brent A. Swarthout
(74) Attorney, Agent, or Firm—Baker Botts LLP

(57) ABSTRACT

In a method and a control arrangement for minimizing the consequences of an accident for motor vehicles, an evaluating unit continuously evaluates environmental data supplied by environmental sensors and vehicle data supplied by a vehicle electronics unit in the light of characteristic features stored in a memory. As a result of this evaluation, it can be ascertained whether an unavoidable accident situation is present with respect to a detected obstacle in which case the evaluating unit performs a controlled braking of the individual wheels of the vehicle by way of a braking control and/or an automatic steering process. This process takes places in such a manner that an optimum speed reduction is achieved as well as a favorable angle of impact. An optimal angle of impact depends on vehicle-specific features and on the particular accident situation.

10 Claims, 1 Drawing Sheet

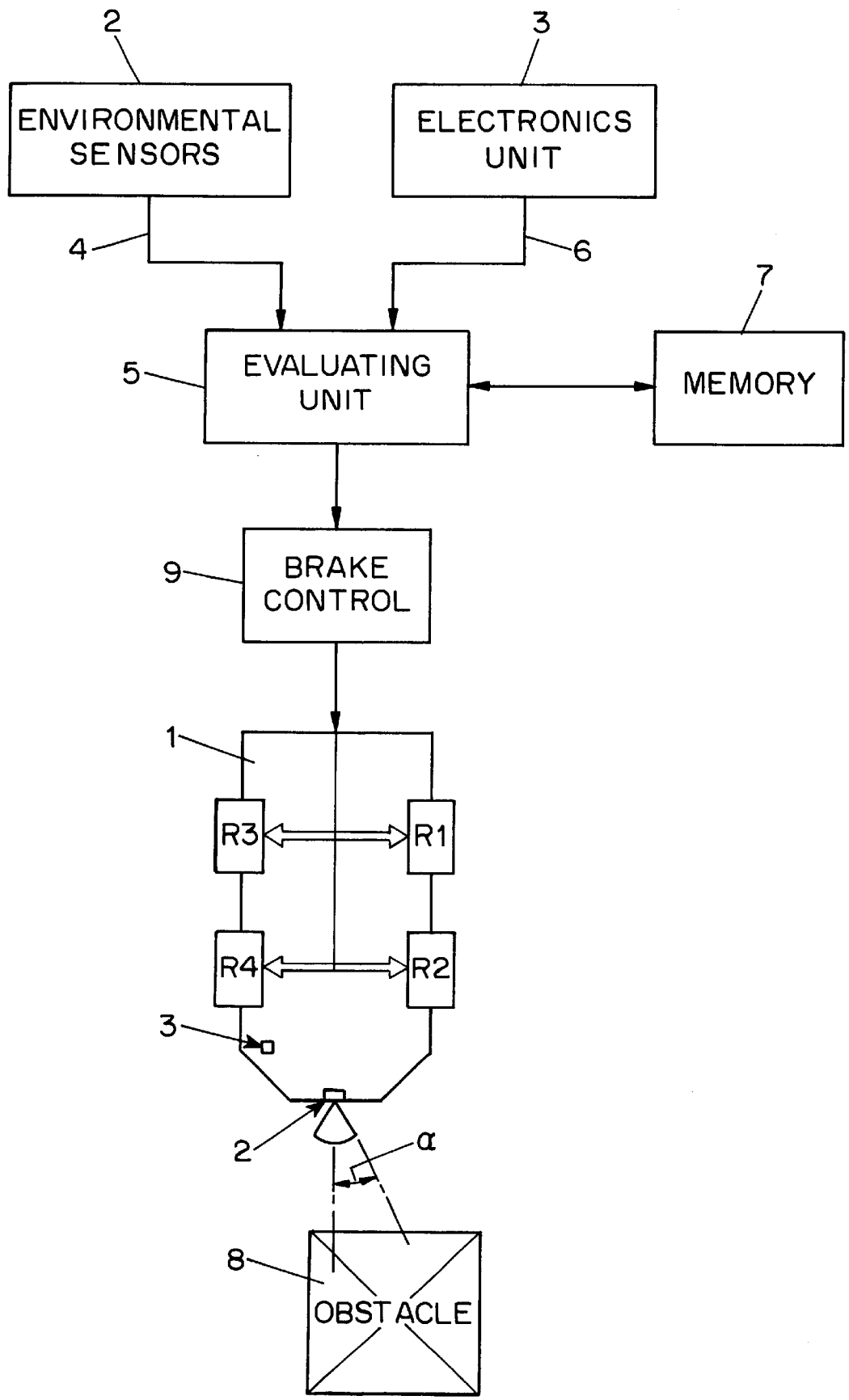

METHOD AND CONTROL ARRANGEMENT FOR MINIMIZING CONSEQUENCES OF ACCIDENTS

BACKGROUND OF THE INVENTION

This invention relates to methods for minimizing consequences of accidents in motor vehicles and to control arrangements for practicing such methods.

There are conventional systems for vehicles that assist the vehicle operator in critical situations to prevent an impending accident in so far as possible by optimal braking or at least reducing the impact velocity at the point of collision to a minimum. Such automatic braking systems are included in many vehicles under the general designation ABS. The basic function of an ABS is to prevent locking of the vehicle wheels upon emergency braking so that the steerability of the vehicle can be preserved even in fill braking. This gives the vehicle operator the opportunity to circumvent the point of collision even in full braking, thereby avoiding a collision, provided there is not an unavoidable accident situation in which no evasion whatever is physically possible.

There are conventional systems intended to prevent a collision of the vehicle with an obstacle by producing a controlled acceleration or deceleration and/or by evasive maneuvers. Such systems, referred to briefly as CAS ("collision avoidance systems"), are intended to guide a vehicle out of collision situations which have been recognized by sensors so that a collision is avoided by an automatic steering arrangement disconnected from the operator, and therefore by steering maneuvers which must be performed independently of the operator, as well as automatic accelerations and decelerations of the vehicle controlled independently of the operator. U.S. Pat. No. 5,541,590 discloses an arrangement that evaluates the surroundings of a vehicle for possible collisions by evaluating images of the surroundings, taken by a running CCD camera and, with reference to additional signals relating to the operating condition of the vehicle, exerts an influence on vehicle speed and steering movement. In another arrangement, described in U.S. Pat. No. 5,461,351, the roadway area to be monitored is segmented and, with incorporation of vehicle condition data, rules are derived on how a detected obstacle can be avoided by braking and steering maneuvers. The chief problem of these prior art arrangements is their complexity, requiring an expenditure which is not practical. Moreover, accident situations may arise so suddenly that avoidance of the accident by early evasion is no longer possible.

European Patent Publication No. 0 545 437 discloses a method of avoiding collisions of motor vehicles by which other vehicles at a distance in the direction of travel are detected and warning messages warn the vehicle operator of impermissible approaches to such vehicles. Then, since the minimum spacing from the vehicles has not yet been attained, the operator has an opportunity to initiate appropriate braking maneuvers. When the spacing falls below a minimum allowable distance, the vehicle is braked automatically so that the required safe interval is restored. In an accident situation that rises suddenly, this system carries out an automatic emergency braking for optimal velocity reduction.

German Offenlegungsschrift No. 38 30 790 also discloses a method and an arrangement for automatic collision avoidance of automatically guidable vehicles, which recognizes current collision hazards using sensors. If a collision hazard is ascertained, the system guides the vehicle along a collision-free path around a detected obstacle. If an unavoidable accident situation produces an impending collision, however, this system involves the danger that the automatically guided vehicle may be directed from a more favorable collision position into a collision position less favorable to the occupants.

German Offenlegungsschrift No. 196 47 283 discloses an arrangement for avoidance and/or minimization of conflict situations in road traffic which is capable of controlling the operation of a vehicle in an unavoidable accident situation. If the operator is no longer in a position to avoid an impending accident, this arrangement intervenes and takes steps to limit damage, for example, by preferring a collision with a garbage can on the sidewalk to hitting a person in the roadway. Thus, this arrangement performs an automatic steering function, requiring a correspondingly high technical expense.

SUMMARY OF THE INVENTION

Accordingly, it is an object of the present invention to provide a method and control arrangement for minimizing the consequences of accidents which avoids disadvantages of the prior art.

Another object of the invention is to provide a method of minimizing the consequences of accidents in the event of an unavoidable collision which requires the least possible technical expenditure.

These and other objects of the invention are attained by providing a method and arrangement for braking of the individual vehicle wheels and/or an influence on the vehicle steering system in such a way that the vehicle is rotated into a position which minimizes the consequences of accident. In this way, a critical angle of impact or an unfavorable "offset" impact for the occupants of the vehicle can be avoided.

An evaluating unit in accordance with the invention may take into consideration certain vehicle-specific features and the dynamic data involved in the accident situation in such a way that a reduction of the consequences of accident is achieved.

In a particular embodiment of the invention, the distance or the continually varying relative coordinates between the vehicle and an obstacle are determined, and the rate of change of the distance or of the relative coordinates is used to control a braking maneuver. In this way, the evaluating unit can recognize whether there is an unavoidable accident situation and what characteristics the accident situation presents. Moreover, numerous different accident situations, each with an associated preferred angle of impact, may be stored in a memory so that the evaluating unit can transmit the required control signals to an automatic braking system and/or a steering control system to rotate the vehicle, for example, in the direction of the desired angle of impact.

An unavoidable accident situation occurs when an avoidance or a stop short of the obstacle is no longer possible. This is recognized by the evaluating unit from the limit values stored in a memory. If these limit values are transgressed, the evaluating unit initiates an automatic braking maneuver to obtain as low an impact energy and as optimal a vehicle orientation at impact as possible. In fact, it may definitely be expedient to permit a somewhat higher impact velocity, if appropriate braking maneuvers can achieve a more favorable impact position for the vehicle. The criteria for this decision are preferably stored in a memory to which the evaluating unit has constant access.

It may be advantageous to control the braking maneuver as a function of seat occupancy. If there are no occupants in the vehicle other than the driver, a different angle of impact may be favorable for purposes of reducing the consequences of accident to the driver than would be the case if the vehicle were fully occupied.

The method may be carried out in such a way that, in an unavoidable accident situation, a maximal deceleration of vehicle speed occurs before a correction of the angle or position of impact is undertaken. Whether such a two-step braking maneuver is to be employed may be made dependent on the particular accident situation encountered.

To practice the method according to the invention, a control arrangement may be provided which includes an evaluating unit receiving environmental data from environmental sensors attached to the vehicle and receiving internal vehicle data from the vehicle electronics unit and which can recognize an unavoidable accident situation based on these data and initiate individual braking of the several vehicle wheels in such a manner that the vehicle tends to assume a preassigned, optimal impact position.

In this regard, a favorably chosen angle of impact can help minimize the consequences of a collision. If, for example, the environmental sensors recognize an impending laterally offset frontal impact, unilateral braking of the wheels may accomplish a change in the angular position of the vehicle to achieve better utilization of the areas of impact energy-absorbing deformation which are built into the vehicle.

In a preferred embodiment, the control arrangement includes a memory containing vehicle-specific features and limit values that are continually compared with the environmental data and vehicle data in the evaluating unit and are utilized to control the braking maneuvers in an accident situation. For different vehicle types, correspondingly different characteristic features may be stored in the memory so that a reduction of the consequences of accident can be optimally achieved, even for different vehicles, without great technical expenditure. The memory may contain the characteristic features of a plurality of possible accident situations, each with appropriate optimal angles of impact, where the desired angles of impact will as a rule have different values for different vehicle types.

In a preferred control arrangement, the evaluating unit controls the braking of the individual wheels by a brake control that is part of an automatic braking system. Hence, an automatic brake system, which is present in the vehicle in any event, may be utilized so that the additional technical expenditure to provide the method and arrangement according to the invention can be kept quite small. In an accident situation, the evaluating unit takes control of the automatic braking system, whereas otherwise the automatic braking system is operated in the conventional manner.

BRIEF DESCRIPTION OF THE DRAWING

Further objects and advantages of the invention will be apparent from a reading of the following description in conjunction with the accompanying drawing which is a schematic block diagram illustrating a representative embodiment of a control arrangement in accordance with the invention.

DESCRIPTION OF PREFERRED EMBODIMENT

In the typical embodiment of the invention schematically shown in the drawing, a vehicle 1 has environmental sensors 2 arranged in the forward part of the vehicle and also has an electronics unit 3 which provides data related to the operation of the vehicle 1. In the schematic illustration, the positions in the vehicle 1 of the environmental sensors and of the vehicle electronics unit are indicated by way of example by designated arrows 2 and 3 while, in the block diagram of the control arrangement, the corresponding circuit blocks representing the environmental sensors and the vehicle electronics unit are designated by corresponding numbers. Environmental data 4 from the environmental sensors 2 are sent to an evaluating unit 5 that also receives vehicle data 6 from the vehicle electronics unit 3. Characteristic features of the vehicle and desired limit values for operating characteristics as well as corresponding ideal angles of impact for various accident situations are stored in a memory 7 connected to the evaluating unit 5. The evaluating unit 5 has constant access to the data stored in the memory 7 and can make continuous comparisons with the actual environmental data and vehicle operating data. The relative coordinates of possible obstacles 8 are transmitted as environmental data to the evaluating unit which can then ascertain in particular the shape and the distance of an obstacle 8. The environmental sensors 2, which may constitute radar units, can also supply environmental data that enable the evaluating unit to distinguish whether an obstacle 8 is a vehicle or a person or some other object.

The vehicle operating data 6 may contain information about vehicle speed, seat occupancy, vehicle weight, brake pedal setting, gas pedal setting and the like. From the environmental data and vehicle operating data, in combination with the characteristic features stored in the memory 7, the evaluating unit 5 can perform selective braking of the individual wheels R1 to R4 of the vehicle 1 by way of a brake control 9 in such a manner that the vehicle 1 will rotate to an optimal angle of impact α with respect to the obstacle 8. In addition to the optimum angle of impact α, an optimal impact position for the vehicle 1 may be controlled as well.

In order to be able to keep the consequences of an accident in an unavoidable situation as small as possible, the evaluating unit 5 evaluates not only the environmental data 4 and the vehicle operating data 6, but also takes account especially of vehicle-specific parameters and characteristic features of the vehicle type which are stored in the memory 7. The data stored in the memory 7 may be stored in the form of a vehicle-specific diagram. For example, for a certain vehicle type, a diagram of optimal angles of impact as functions of the current vehicle speed may be stored in the memory 7.

Although the invention has been described herein with reference to specific embodiments, many modifications and variations therein will readily occur to those skilled in the art. Accordingly, all such variations and modifications are included within the intended scope of the invention.

I claim:

1. A method of minimizing consequences of vehicle accidents comprising providing environmental sensors on a vehicle, detecting objects located in or near the direction of motion of the vehicle using the environmental sensors, providing dynamic parameters relating to vehicle operation to an evaluating unit, supplying data from the environmental sensors to the evaluating unit, continuously comparing in the evaluating unit the data from the environmental sensors and the dynamic parameters with predetermined limit values to detect an impending unavoidable accident situation and, upon detection of an impending unavoidable accident situation, causing the vehicle to be rotated by at least one of an automatic steering maneuver and a controlled braking of individual wheels of the vehicle into an impact position minimizing the consequences of the accident to the vehicle or its occupants.

2. A method according to claim 1 wherein the evaluating arrangement determines the distance or the currently varying relative coordinates between vehicle and an obstacle and the rate of change of the distance or of the relative coordinates is used to control at least one of the braking maneuver and the steering maneuver.

3. A method according to claim 1 wherein individually associated, preferred angles of impact for a plurality of different accident situations are stored in a memory and, upon occurrence of an impending accident situation, the vehicle is caused to be rotated toward a corresponding preferred angle of impact.

4. A method according to claim 1 wherein an unavoidable impending accident situation is detected when the evaluating unit determines that an avoidance or a stop short of the obstacle is no longer possible based on the dynamic parameters relating to vehicle operation.

5. A method according to claim 1 wherein the controlled braking takes place as a function of vehicle seat occupancy.

6. A method according to claim 1 wherein the evaluating unit determines in terms of received data and vehicle-specific features, in an unavoidable accident situation, whether and for how long a maximal deceleration of vehicle speed is to take place before a correction of angle of impact or position of impact is undertaken.

7. A control arrangement for minimizing the consequences of a vehicle accident comprising a vehicle having a plurality of environmental sensors for detecting objects located in or near the direction of motion of the vehicle, an internal vehicle data electronics unit providing signals representing dynamic operating parameters of the vehicle, an evaluating unit for receiving data from the environmental sensors and internal vehicle data from the vehicle data electronics unit and, based on data received from the sensors and the electronics unit, recognizing an unavoidable accident situation and causing individual braking of predetermined vehicle wheels in such a manner that the vehicle will approach a predetermined optimal vehicle impact orientation.

8. A control arrangement according to claim 7 including a memory containing stored vehicle-specific features and operating limits and wherein the evaluating means continually compares the environmental data and vehicle data with the operating limits to control at least one of the braking process and the steering process in an accident situation.

9. A control arrangement according to claim 8 wherein the characteristic features of a plurality of possible accident situations are stored in the memory together with corresponding optimal angles of impact.

10. A control arrangement according to claim 7 wherein the evaluating means controls the braking of individual wheels of the vehicle by a braking control that is part of an automatic braking system in the vehicle.

\* \* \* \* \*